United States Patent
He et al.

(10) Patent No.: US 7,564,384 B2
(45) Date of Patent: Jul. 21, 2009

(54) BINARIZING METHOD AND DEVICE THEREOF

(75) Inventors: Yun He, Shenzhen (CN); Ping Yang, Shenzhen (CN); Wei Yu, Shenzhen (CN); Xinjian Meng, Shenzhen (CN); Jianhua Zheng, Shenzhen (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

(21) Appl. No.: 12/132,959

(22) Filed: Jun. 4, 2008

(65) Prior Publication Data

US 2008/0231483 A1 Sep. 25, 2008

Related U.S. Application Data

(63) Continuation of application No. PCT/CN2006/003290, filed on Dec. 5, 2006.

(30) Foreign Application Priority Data

Dec. 5, 2005 (CN) .................. 2005 1 0127531

(51) Int. Cl.
*H03M 7/00* (2006.01)
(52) U.S. Cl. .................. 341/107; 341/67; 341/50
(58) Field of Classification Search .................. 341/107, 341/67, 65, 50, 106
See application file for complete search history.

(56) References Cited

U.S. PATENT DOCUMENTS

| 5,808,572 | A  | * | 9/1998 | Yang et al. | .................. 341/107 |
| 6,557,137 | B1 | * | 4/2003 | Park et al. | .................. 714/752 |
| 7,053,803 | B1 | * | 5/2006 | Said | .......................... 341/107 |
| 7,228,001 | B2 |   | 6/2007 | Kobayashi et al. | |

FOREIGN PATENT DOCUMENTS

| CN | 1529988 A | 9/2004 |
| CN | 1645750 A | 7/2005 |
| JP | 02-101822 A | 4/1990 |

* cited by examiner

*Primary Examiner*—Peguy JeanPierre
(74) *Attorney, Agent, or Firm*—Leydig, Voit & Mayer, Ltd

(57) ABSTRACT

A binary coding and decoding method and apparatus for MVD (Motion Vector Difference) absolute values, includes: dividing symbols for MVD absolute values to be coded into a plurality of subsets according to probability distribution properties; assigning a binary codeword for each subset; assigning a binary codeword for each symbol in each subset; concatenating and outputting the binary codeword for each subset and the binary codeword for each symbol in the subset, as the binary coding result. At the decoding side, decoding operations are performed by using a principle corresponding to that at the coding side. In this manner, the invention makes full use of the source properties on one hand, and effectively prevents the codeword length from being too long on the other hand. It has been experimentally testified that a better compression effect may be achieved during arithmetic coding process and thus the image coding performance may be improved effectively.

20 Claims, 3 Drawing Sheets

US 7,564,384 B2

BINARIZING METHOD AND DEVICE THEREOF

CROSS-REFERENCE TO RELATED APPLICATIONS

This application is a continuation of International Patent Application No. PCT/CN2006/003290, filed Dec. 5, 2006, which claims priority to Chinese Patent Application No. 200510127531.8, filed Dec. 5, 2005, both of which are hereby incorporated by reference in their entirety.

FIELD OF THE INVENTION

The invention relates to the field of image coding techniques, and more particularly, to a technique for binary coding MVD (Motion Vector Difference) absolute values.

BACKGROUND

Digital video techniques have found widespread applications in various aspects of the society, such as telecommunication, broadcast, and entertainment. Video coding is to compress digital video information so that more efficient transmission and storage may be achieved. Video coding is a core multimedia technology, and video compression coding standards are the basis of the digital media industry. H.264/AVC (MPEG4-Part10) is a new generation of video coding standards jointly developed by ITU-T VCEG (Video Coding Experts Group) and ISO/IEC MPEG JVT (Joint Video Team). Additionally, other examples of video coding standards may include AVS1.0-P2 developed by VC-1 (previously known as WMV-9) and AVS (Audio Video Standard) or the like.

The basic framework for MPEG/JVT/VCEG video coding standards is to employ a hybrid coding framework incorporating block-based motion compensation and transform coding, including intra-frame prediction, inter-frame prediction, transformation, quantization, entropy coding, and so on. For inter-frame prediction, block-based motion vectors are used to eliminate redundancy among images. For intra-frame prediction, spatial prediction modes are used to eliminate redundancy within an image. Then, prediction residual is subject to transformation and quantization, to eliminate visual redundancy within the image. Finally, entropy coding is applied to the motion vectors, prediction modes, quantization parameters and transformation coefficients for compression. During video decoding, the basic processing unit is macro block. A macro block has a luminance block of 16×16 pixels and a corresponding chroma block. A macro block may be divided into blocks, and the size of a block may be 16×8, 8×16, 8×8, 8×4, 4×8, 4×4 or the like. A block is usually subject to intra-frame, inter-frame predictions and transformation.

A motion vector (MV) is the output of a motion estimation operation during inter-frame prediction in video coding, and equals the coordinate offset of the current block relative to a matching reference block in the image, including horizontal MV and vertical MV. Motion estimation may comprise integer-pixel motion estimation and sub-pixel motion estimation. Sub-pixel may include ½ pixel and ¼ pixel. Motion estimation is performed in units of minimum sub-pixels, such as ¼ pixel, and thus motion vector is an integer constantly. To enable a more efficient compression, prediction processing is further performed on motion vectors. Prediction processing on motion vectors is usually based on motion vectors of adjacent blocks. A prediction value is referred to as MVD (Motion Vector Difference), including horizontal MVD and vertical MVD. The unit of MVD is same as that of MV, and is also minimum sub-pixel, such as ¼ pixel. Thus, MVD is also an integer constantly. Accordingly, the MVD absolute value is a nonnegative integer.

In the framework of video compression, the transformed and quantized residual coefficients and MVDs are processed at the entropy coder, to eliminate statistical redundancy among data, and then outputted into a code stream.

The entropy coder may comprise a Huffman coder or an arithmetic coder. The two coders are widely used in standards such as H.264/AVC and AVS1.0-P2. The Huffman coder maps symbols with different probabilities to binary bit strings of different lengths through variable length coding, so as to remove statistical redundancy. The arithmetic coder removes statistical redundancy by mapping a symbol sequence to a numeral within an interval of [0, 1).

Currently used arithmetic coders mainly include Binary Arithmetic Coders (BAC), for example, Q-Coder (a binary arithmetic coder), QM-Coder (a binary arithmetic coder), MQ-Coder (a binary arithmetic coder), and CABAC (Context based Adaptive Binary Arithmetic Coder) in H.264/AVC. Each BAC has a binary bit string as its input. Recursive division of the interval may be implemented according to the probabilities of symbols (0, 1) in the bit string. Ultimately, the entire bit string is mapped to a code stream.

Because a BAC has a binary bit string as its input as shown in FIG. 1, the coded data first needs to be binarized in video compression standards (for example, H.264/AVC standard). That is, the symbols to be coded (i.e., non binary data, such as the transformed and quantized coefficients or MVD absolute values) are mapped to a binary string. Binarization is a pre-process before binary arithmetic coding is performed. In the present invention, binarization is also referred to as binary coding, which means assigning a binary codeword to a symbol.

Currently, many methods may be used for binarization, for example, fixed length code, unary code, exp-Golomb and etc. Descriptions are made below to various coding processes.

(1) Fixed Length Code

A fixed length code has a fixed codeword length. In this way, a symbol set corresponding to a fixed length code has a limited number of symbols, with the number of symbols determined by the length of the fixed length code. Typically, a fixed length code of length N may represent $2^N$ symbols. Taking 8 symbols as an example, the length of the fixed length code is 3, specifically as shown in Table 1.

TABLE 1

| Symbol | Codeword |
|--------|----------|
| 0 | 000 |
| 1 | 001 |
| 2 | 010 |
| 3 | 011 |
| 4 | 100 |
| 5 | 101 |
| 6 | 110 |
| 7 | 111. |

(2) Unary Code

The unary code represents a symbol as a run of 1's (or 0's) and a tail 0 (or 1). The number of 1's (or 0's) in the run is equal to the value of the symbol. Unary code is very simple. However, when the value of the symbol is rather large, a long codeword string will occur, as shown in Table 2.

TABLE 2

| Symbol | Codeword |
|--------|----------|
| 0 | 0 |
| 1 | 10 |
| 2 | 110 |
| 3 | 1110 |
| 4 | 11110 |
| 5 | 111110 |
| 6 | 1111110 |
| 7 | 11111110 |
| ... | |

Truncated unary code is a special form of unary code. Unary code may represent an infinite number of codewords. However, when there is a finite number of coedwords, the last-bit terminator for the last codeword is redundant and thus may be removed. Such a codeword is referred to as truncated unary code. Specifically, when the number of codwords is N+1, the $(N+1)^{th}$ codeword is set as a run of N 1's (or 0's) and the terminator 0 (or 1) is omitted, to form a N-bit truncated unary code. As shown in Table 2, the codeword of symbol "7" is modified to be "1111111", that is, to have 7-bit truncated unary code.

(3) Oder k Exp-Golomb Code

The exp-Golomb code has a prefix portion and a postfix portion. The number of codewords grows exponentially as the code length increases. For order k exp-Golomb code, its prefix portion has a run of 0's and a 1. The number of 0's in the longest run read from the leftmost bit in the prefix is counted as LeadingZeroBits. In this way, the bit number of the postfix portion is determined as LeadingZeroBits+k. From the read bit number of the postfix, bits(LeadingZeroBits+k) may be determined through parsing. For parsing an order k exp-Golomb code, the codeword may be calculated as CodeNum=$2^{LeadingZeroBits+k}-2^k$+bits(LeadingZeroBits+k). Table 3 lists exp-Golomb codewords when k=0, 1, 2, or 3.

TABLE 3

Order k exp-Golomb code table

| Order | Codeword Structure | The Range of CodeNum |
|-------|--------------------|-----------------------|
| k = 0 | 1 | 0 |
|  | 0 1 $x_0$ | 1~2 |
|  | 0 0 1 $x_1 x_0$ | 3~6 |
|  | 0 0 0 1 $x_2 x_1 x_0$ | 7~14 |
|  | ... | ... |
| k = 1 | 1 $x_0$ | 0~1 |
|  | 0 1 $x_1 x_0$ | 2~5 |
|  | 0 0 1 $x_2 x_1 x_0$ | 6~13 |
|  | 0 0 0 1 $x_3 x_2 x_1 x_0$ | 14~29 |
|  | ... | ... |
| k = 2 | 1 $x_1 x_0$ | 0~3 |
|  | 0 1 $x_2 x_1 x_0$ | 4~11 |
|  | 0 0 1 $x_3 x_2 x_1 x_0$ | 12~27 |
|  | 0 0 0 1 $x_4 x_3 x_2 x_1 x_0$ | 28~59 |
|  | ... | ... |
| k = 3 | 1 $x_2 x_1 x_0$ | 0~7 |
|  | 0 1 $x_3 x_2 x_1 x_0$ | 8~23 |
|  | 0 0 1 $x_4 x_3 x_2 x_1 x_0$ | 24~55 |
|  | 0 0 0 1 $x_5 x_4 x_3 x_2 x_1 x_0$ | 56~119 |
|  | ... | ... |

When the above order k exp-Golomb codes are parsed, a search is made first from the current position of the bit stream until the first non-zero bit is found, and the number of zeros found in this process is accumulated as leadingZeroBits. Then, CodeNum may be calculated from leadingZeroBits. The corresponding pseudo code is described as follows.

```
leadingZeroBits = −1;
for ( b = 0; ! b; leadingZeroBits++ )
    b = read_bits(1)
CodeNum = 2^{leadingZeroBits + k} − 2^k + read_bits(leadingZeroBits + k).
```

The first form of order k exp-Golomb code is described as above. The order k exp-Golomb code may have a second form. For the order k exp-Golomb code of this second form, the prefix portion has a run of 1's and a 0. The number of 1's in the longest run read from the leftmost bit of the prefix is counted as LeadingBits. In this way, the bit number of the postfix portion is determined as LeadingBits+k. From the read bit number of the postfix, bits(LeadingBits+k) may be determined through parsing. For parsing a order k exp-Golomb code, the codeword may be calculated as CodeNum=$2^{LeadingBits+k}-2^k$+bits(LeadingBits+k). Table 4 lists exp-Golomb codewords of this form when k=0, 1, 2, or 3.

TABLE 4

| Order | Codeword Structure | The Range of CodeNum |
|-------|--------------------|-----------------------|
| k = 0 | 0 | 0 |
|  | 1 0 $x_0$ | 1~2 |
|  | 1 1 0 $x_1 x_0$ | 3~6 |
|  | 1 1 1 0 $x_2 x_1 x_0$ | 7~14 |
|  | ... | ... |
| k = 1 | 0 $x_0$ | 0~1 |
|  | 1 0 $x_1 x_0$ | 2~5 |
|  | 1 1 0 $x_2 x_1 x_0$ | 6~13 |
|  | 1 1 1 0 $x_3 x_2 x_1 x_0$ | 14~29 |
|  | ... | ... |
| k = 2 | 0 $x_1 x_0$ | 0~3 |
|  | 1 0 $x_2 x_1 x_0$ | 4~11 |
|  | 1 1 0 $x_3 x_2 x_1 x_0$ | 12~27 |
|  | 1 1 1 0 $x_4 x_3 x_2 x_1 x_0$ | 28~59 |
|  | ... | ... |
| k = 3 | 0 $x_2 x_1 x_0$ | 0~7 |
|  | 1 0 $x_3 x_2 x_1 x_0$ | 8~23 |
|  | 1 1 0 $x_4 x_3 x_2 x_1 x_0$ | 24~55 |
|  | 1 1 1 0 $x_5 x_4 x_3 x_2 x_1 x_0$ | 56~119 |
|  | ... | ... |

When the above order k exp-Golomb codes are parsed, a search is made first from the current position of the bit stream until the first "0" bit is found, and the number of "1" bits found in this process is accumulated as leadingBits. Then, CodeNum may be calculated from leadingBits. The corresponding pseudo code is described as follows.

```
leadingBits = −1;
for ( b = 1; ! b; leadingBits++ )
    b = read_bits(1)
CodeNum = 2^{leadingBits + k} − 2^k + read_bits(leadingBits + k).
```

From the specific implementations of the above various binary coding methods, it can be seen that each binary coding method has its limitations in practical applications. That is, they cannot provide appropriate binary coding by adapting to the distribution properties of various sources flexibly, which influences the coding performance to some extent.

SUMMARY

The invention provides a binarization method and apparatus, configured to perform binary encoding and decoding operations on MVD (Motion Vector Difference) absolute values in a video coder, so that the resulting binary symbols can be well adapted to the distribution properties of the MVD absolute values and thus enhance the coding performance.

The present invention provides a binary coding method for MVD (Motion Vector Difference) absolute values in a video coder, including: dividing symbols for MVD absolute values into a plurality of subsets according to their probability distribution properties, each subset including symbols for one or more consecutive nonnegative integers; assigning a binary codeword for each subset; assigning a binary codeword for each of the symbols within a subset according to their respective probability distributions in the subset, all the symbols in a subset having a consistent coding type; and concatenating and outputting the binary codeword for each subset and the binary codeword for each symbol in the subset, as a binary coding result for the symbol.

The present invention also provides a binary coding apparatus for MVD (Motion Vector Difference) absolute values in a video coder, including a subset division unit, a subset binary coding unit, a subset symbol binary coding unit and a binary result determination unit.

The subset division unit is configured to divide symbols for MVD absolute values into a plurality of subsets according to their probability distribution properties, each subset including symbols for one or more consecutive nonnegative integers.

The subset binary coding unit is configured to assign a binary codeword for each subset.

The subset symbol binary coding unit is configured to assign a binary code for each of the symbols in each subset according to their respective probability distributions, all the symbols in a subset having a consistent coding method.

The binary result determination unit is configured to concatenate and output the binary codeword for each subset and the binary codeword for each symbol in the subset, as a binary coding result for the symbol.

The present invention still provides a binary decoding method for MVD (Motion Vector Difference) absolute values in a video decoder, including: receiving a binary codeword for an MVD absolute value; matching coded codewords for subsets corresponding to a subset coding rule sequentially with a bit segment in the most front of the binary codeword, to determine the number of a subset to which the MVD absolute value belongs; obtaining a coding rule for symbols included in the subset according to the determined subset number; parsing other bit segments in the binary codeword according to the coding rule, to obtain a symbol in the subset; and determining a symbol for the MVD absolute value according to a subset division rule.

The present invention further provides a binary decoding apparatus for MVD (Motion Vector Difference) absolute values in a video decoder, including a prefix parsing unit, a postfix parsing unit and a symbol determination unit.

The prefix parsing unit is configured to receive a binary codeword for an MVD absolute value, and match coded codewords for subsets corresponding to a subset coding rule sequentially with a bit segment in the most front of the binary codeword, so as to determine the number of a subset to which the MVD absolute value belongs.

The postfix parsing unit is configured to obtain a coding rule for symbols included in the subset according to the subset number determined by the prefix parsing unit, and parse other bit segments in the binary codeword according to the coding rule, so as to obtain a symbol in the subset.

The symbol determination unit is configured to determine a symbol for the MVD absolute value according to a subset division rule.

From the above technical solution provided in the present invention, it can be seen that the prefix portion and the postfix portion of a binary symbol string may be adjusted. It can be adapted to the probability distribution properties of different symbols from various sources, to achieve the purpose of source compression coding and improve the coding efficiency. Furthermore, it prevents the codeword length from being too long due to too many symbols in a symbol set which may be caused by using a single type of codeword. The method is equally applicable to the binary pre-processing in arithmetic coders. The design of the prefix portion provides an effective method for codeword classification in arithmetic coders, so as to improve the performance of arithmetic codes.

DETAILED DESCRIPTION

The invention provides a method for implementation of binarization over symbols to be coded (referred to as symbols hereafter for simplicity). The prefix portion and postfix portion of a binary string may be adjusted, so as to be adapted to the distribution properties of different sources symbols.

Specifically, a symbol is mapped to a binary bit string in the invention. The binary bit string has two parts of a prefix and a postfix. The symbol is defined as an object to be coded, and may be a numeral (for example, 1, 2, 3 . . . ), a letter (for example, a, b, c . . . ) or any other character. Symbols as a whole may form a symbol set. During the coding process, a method may be used to map a symbol to a binary sequence representation, and the binary sequence is a binary string corresponding to the symbol. The binary sequence may be referred to as the codeword corresponding to the symbol. For example, the symbol "a" is represented as "0011", wherein "a" is the symbol and "0011" is the binary string or codeword corresponding to "a".

The binary coding process provided in the invention comprises the following implementation.

First, a set of symbols to be coded is divided into a plurality of subsets according to the distribution properties of the symbols. The class of each subset is assigned a codeword, which is used as the prefix portion of the symbols to be coded. That is, each subset is assigned a binary codeword. A codeword used to identify each subset is referred to as the identification codeword for the subset class. In particular, the implementation may use unary coding method, fixed length coding method, exp-Golomb coding method or any other coding method with which the prefix may be uniquely identified.

Then, each symbol within a subset is assigned a further codeword, which is used as the postfix portion of the symbol. That is, each symbol within each subset is assigned a further binary codeword, which is used as the postfix portion of the symbol. In particular, the implementation may use unary coding method, fixed length coding method, or exp-Golomb coding method.

It is to be noted that the postfix portion may be omitted if there is only one symbol within a subset. That is, the symbol may be identified with the identification codeword for the subset. In the whole coding process, however, at least one subset has two or more symbols.

The present invention is applicable to binarization of MVD absolute values in video coding.

Detailed descriptions will be made below to embodiments of the invention with reference to the accompanying drawings.

A MVD is divided into two parts in advance: mvdAbs (that is, the absolute value of the MVD) and mvdSign (that is, negative or positive). If mvdAbs is zero, the corresponding binary symbol string is "0" and there is no mvdSign; otherwise, mvdAbs is followed by mvdSign.

Figure 1:
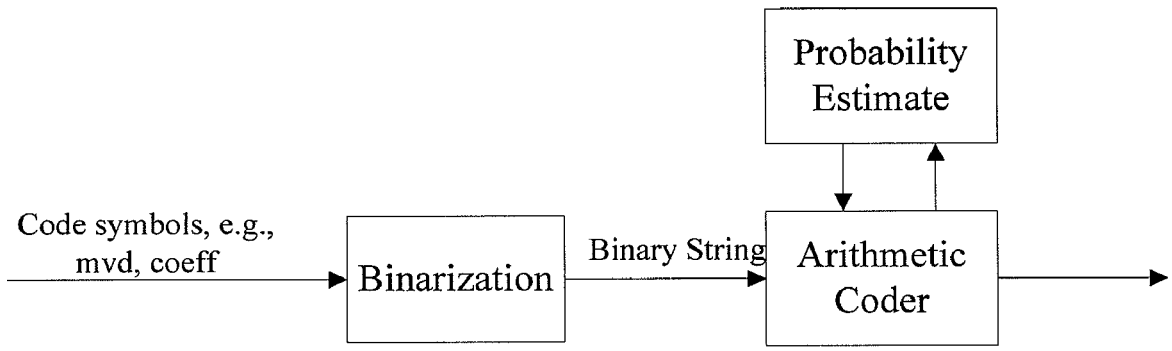
FIG. 1 is a diagram illustrating the principle of a binary arithmetic coder.
Figure 2:
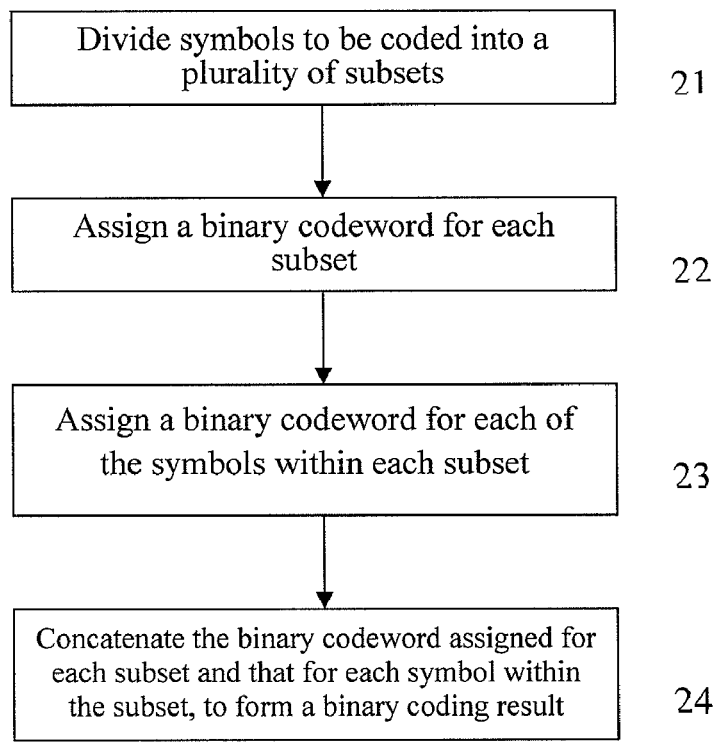
FIG. 2 is a diagram illustrating an embodiment of a coding process as provided in the present invention.

The binarization processing for MVD absolute values (abbreviated to MVD hereafter) is as follows. As shown in FIG. 2, four steps are involved.

Step 21: Symbols for MVD absolute values are divided into a plurality of subsets according to their probability distribution properties, each subset including one or more consecutive nonnegative integers;

Step 22: A binary codeword is assigned for each subset;

Step 23: Binary coding is performed on the symbols in each subset according to their respective probability distributions, all the symbols in a subset having a consistent coding method; and Step 24: The binary codeword for each subset and the binary codeword for each symbol in the subset are concatenated and outputted as a binary coding result for the symbol.

For ease of further understanding the above process, detailed descriptions will be made below to the binary processing procedure provided in the invention by way of example.

Referring to FIG. 2, a first embodiment is as follows.

Figure 3:
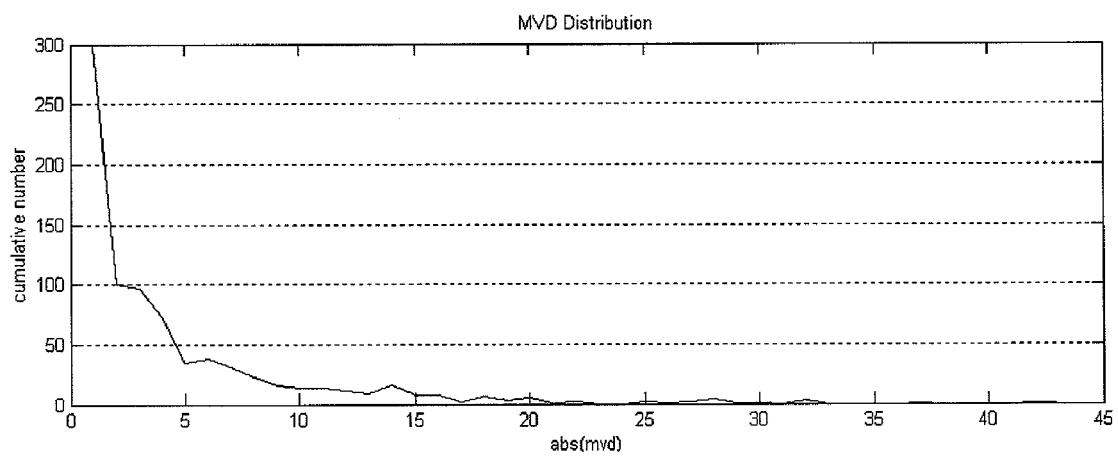
FIG. 3 is a diagram illustrating the distribution of MVD absolute values.

Step 21: MVDs to be coded are divided into a plurality of subsets;

The MVDs have a typical distribution as shown in FIG. 3. As illustrated, the x-axis represents the MVD absolute values, and the y-axis shows their distribution (the occurrence times of various MVD absolute values of all blocks in a coding frame of image are accumulated). From the distribution properties of the MVDs as shown in FIG. 3, it can be observed that the distribution of 0 accounts for a large percentage, the distribution of 1 to 5 represents a fast decreasing process, the distribution of 6 to 20 represents a slow decreasing process, and the distribution of more than 20 is uniform substantially. Accordingly, the symbol set is divided into 4 subsets, 0: {0}, 1: {x|1<=x<6}, 2: {x|6<=x<21}, and 3: {x|x>=21}.

Step 22: A codeword is assigned for each subset class. That is, each subset is assigned a binary codeword, specifically as shown in Table 5.

TABLE 5

| Class Number | Codeword |
|---|---|
| 0 | 0 |
| 1 | 10 |
| 2 | 110 |
| 3 | 111 |

In Table 4, unary coding method is used for codeword assignment. Alternatively, other binary coding methods may be used depending on the distributions of source symbols.

Step 23: A binary codeword is assigned for each of the symbols within each subset;

Specifically, after each subset class is assigned a codeword, a codeword is assigned to each of the symbols within each subset. Since subset 0 has only one symbol, this class only needs a codeword for the subset class. Unary codes are used for subset 1, order 0 exp-Golomb codes are used for subset 2, and order 3 Exp-Golomb codes are used for subset 3. For the symbols in different subsets, the codewords of the symbols may be the same. For the symbols in a certain subset, codeword assignment may be accomplished by using many methods according to their respective probability distribution properties within the subset. Generally, a symbol with higher probability leads to a codeword with a shorter length. Unary coding and exp-Golomb coding are simple implementations for this guideline, but the invention is not limited in this context.

Step 24: The binary codeword assigned for each subset in step 22 and the binary codeword assigned for each symbol in the subset in step 23 are concatenated to form a binary coding result including a prefix portion and a postfix portion.

Further referring to the symbols with prefixes assigned in Table 4, after codeword assignment for symbols within each subset in step 23, the bit string is shown in Table 6.

TABLE 6

| Class Number | Symbol | Codeword Prefix | Postfix |
|---|---|---|---|
| 0 | 0 | 0 | |
| 1 | 1 | 10 | 0 |
|   | 2 | 10 | 01 |
|   | 3 | 10 | 001 |
|   | 4 | 10 | 0001 |
|   | 5 | 10 | 0000 |
| 2 | 6 | 110 | 0 |
|   | 7 | 110 | 010 |
|   | 8 | 110 | 011 |
|   | ... | ... | |
|   | 20 | 110 | 0001111 |
| 3 | 21 | 111 | 0000 |
|   | 22 | 111 | 0001 |
|   | ... | ... | |

Till now, the binary coding results are obtained for the symbols to be coded.

In different video coding standards and different coding profiles (for example, progressive scanning or interlaced scanning), the distribution properties of MVD absolute values may vary. The corresponding subset division method and coding method may be adjusted in part, as in example 2.

Further referring to FIG. 2, a second embodiment is as follows.

Step 21: MVD absolute values to be coded are divided into a plurality of subsets;

According to the distribution properties of the MVD absolute values, the entire symbol set is divided into three subsets, 0: {0}, 1: {x|1<=x<9}, and 2: {x|x>=9}.

Step 22: A codeword is assigned for each subset class. That is, each subset is assigned a binary codeword. Specifically, the assignment is shown in Table 7.

TABLE 7

| Class Number | Codeword |
|---|---|
| 0 | 0 |
| 1 | 10 |
| 2 | 11 |

In Table 6, truncated unary coding method is used for codeword assignment. Alternatively, other binary coding methods may be used depending on the distributions of source symbols.

Step 23: A binary codeword is assigned for each of the symbols within each subset;

Specifically, after each subset class is assigned a codeword, a further codeword is assigned to each of the symbols within the subset. The assignment is as follows.

Since subset 0 has only one symbol, this class only needs a codeword for the subset class.

Truncated unary codes are used for subset 1, multiple 0's plus a last "1". The codeword for the last symbol in the subset is truncated by the last "1".

Order 3 exp-Golomb codes are used for subset 2. In particular, order k (k=3) exp-Golomb codes of the second form as described in the background art may be used.

For the symbols in different subsets, the codewords of the symbols may be the same. For the symbols in a certain subset, codeword assignment may be accomplished by using many methods according to their respective probability distribution properties within the subset. Generally, a symbol with higher probability leads to a codeword with shorter length. Truncated unary codes and exp-Golomb codes are simple implementations for this guideline, but the invention is not limited in this context.

Step 24: The binary codeword assigned for each subset in step 22 and the binary codeword assigned for each symbol within the subset in step 23 are concatenated, to form a binary coding result including a prefix portion and a postfix portion.

Further referring to the symbols with prefixes assigned in Table 6, the bit string is shown in Table 8 after codeword assignment for symbols within each subset in step 23.

TABLE 8

| Class Number | Symbol | Prefix | Postfix |
|---|---|---|---|
| 0 | 0 | 0 | |
| 1 | 1 | 10 | 0 |
|  | 2 | 10 | 01 |
|  | 3 | 10 | 001 |
|  | 4 | 10 | 0001 |
|  | 5 | 10 | 00001 |
|  | 6 | 10 | 000001 |
|  | 7 | 10 | 0000001 |
|  | 8 | 10 | 0000000 |
| 2 | 9 | 11 | 0000 |
|  | 10 | 11 | 0001 |
|  | 11 | 11 | 0010 |
|  | ... | | ... |

Till now, the binary coding results are obtained for the symbols to be coded.

Figure 4:
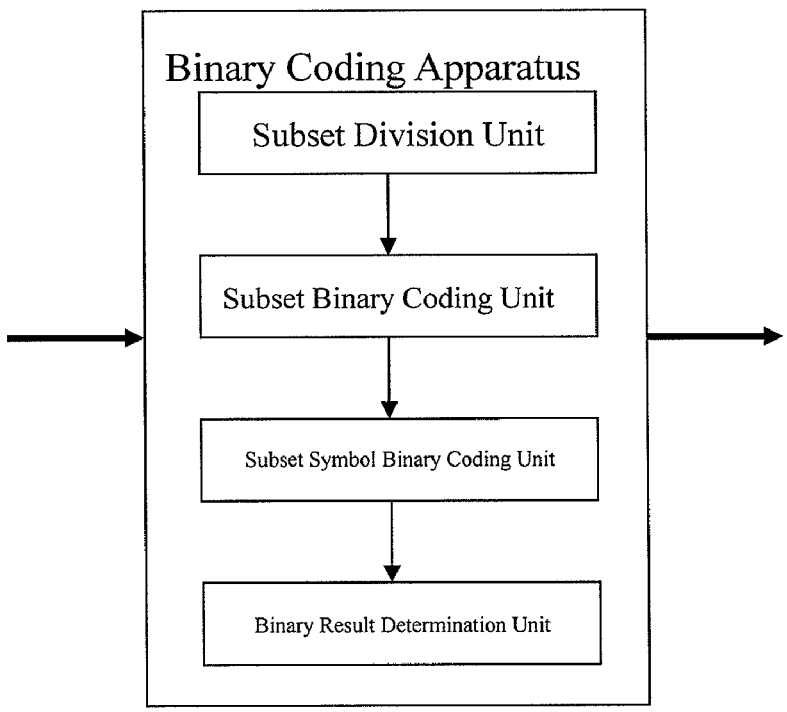
FIG. 4 is a block diagram illustrating an embodiment of a coding apparatus as provided in the present invention.

The invention also provides a binary coding apparatus for MVD (Motion Vector Difference) absolute values. The specific configuration is shown in FIG. 4, comprising a subset division unit, a subset binary coding unit, a subset symbol binary coding unit and a binary result determination unit.

(1) The Subset Division Unit

This unit is configured to divide MVD absolute values which need binarization processing, into a plurality of subsets according to probability distribution properties, each subset including one or more consecutive nonnegative integers. Specific divisions have been illustrated above, and the description is omitted here.

(2) The Subset Binary Coding Unit

This unit is configured to assign a binary codeword for each subset.

In this unit, fixed length code or variable length code may be used to assign a binary codeword for each subset. Here, the fixed length code may include, but is not limited to truncated unary code.

(3) The Subset Symbol Binary Coding Unit

This unit is configured to assign a binary code for each of the symbols within each subset, all the symbols within a subset having a consistent coding rule. The coding method is based on the probability distributions of the symbols within the subset.

In this unit, fixed length code or variable length code may be used to assign a binary codeword for each symbol within the subset. Here, the fixed length code may include, but is not limited to truncated unary code and exp-Golomb code. For symbols within different subsets, the coding method may vary.

(4) The Binary Result Determination Unit

This unit is configured to concatenate the binary codeword assigned for each subset and the binary codeword assigned for each symbol in the subset, so as to form a binary coding result corresponding to each of the symbols which need binarization processing.

The invention also provides specific implementations for binary decoding MVD (Motion Vector Difference) absolute values. Binary decoding is the inverse of binary coding. A brief description will be made below to specific embodiments of the binary decoding solution.

Figure 5:
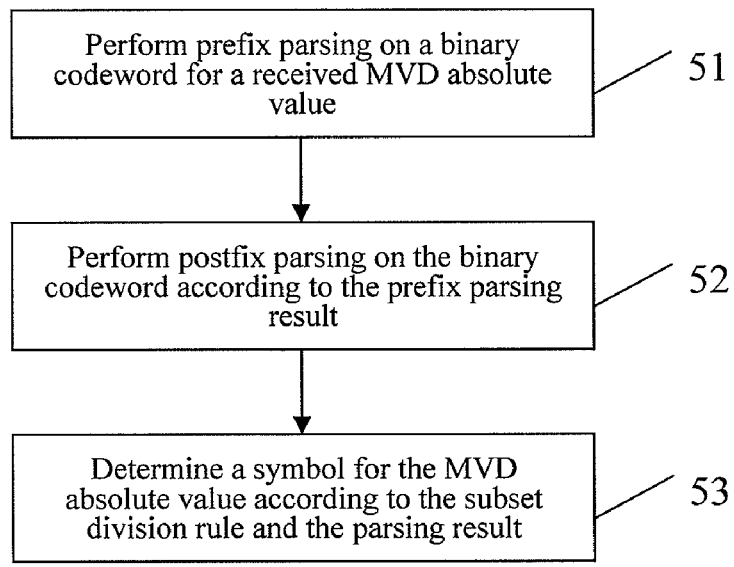
FIG. 5 is a diagram illustrating an embodiment of a decoding process as provided in the present invention.

As shown in FIG. 5, an embodiment of the binary decoding implementation comprises the following.

Step 51: prefix parsing

For a binary codeword of an MVD absolute value which is obtained through arithmetic decoding, coded codewords for subsets are obtained according to a pre-configured subset coding rule. The coded codewords for the subsets are matched in turn with a bit segment in the most front of the binary codeword. If a codeword is matched, the bit segment in the corresponding binary codeword is taken as the prefix and the remaining bit segment as the postfix. From the prefix, it is possible to determine the number of the corresponding subset according the subset coding method.

As in the previous coding example, if the input binary codeword for an MVD absolute value is "110001", and the subset coding rule is the truncated unary coding with three subset codewords "0", "10" and "11" in total, the three subset codewords are used in turn to match a bit segment in the most front of the binary codeword "110001". By matching, the prefix is determined as "11", and the remaining part is determined as the postfix "0001". According to the subset coding rule, the subset number is determined as "2" by parsing the prefix "11".

Step 52: postfix parsing

According to the subset class, a coding rule for the symbols within the subset may be determined. According to the coding rule, the postfix is parsed, so as to obtain a symbol within the subset.

As in the example in step 51, the coding method for the subset 2 is determined as order 3 exp-Golomb coding. With this method, the postfix "0001" is parsed, to obtain a symbol "1" (that is, the second symbol in the subset).

Step 53: determining the symbol for the MVD absolute value according to the subset division rule.

As in the coding example 2, since subset 2 is known as {x|x>=9}, the symbol for the MVD absolute value corresponding to the symbol "1" in the subset is "1"+"9", that is, a decimal number "10".

Figure 6:
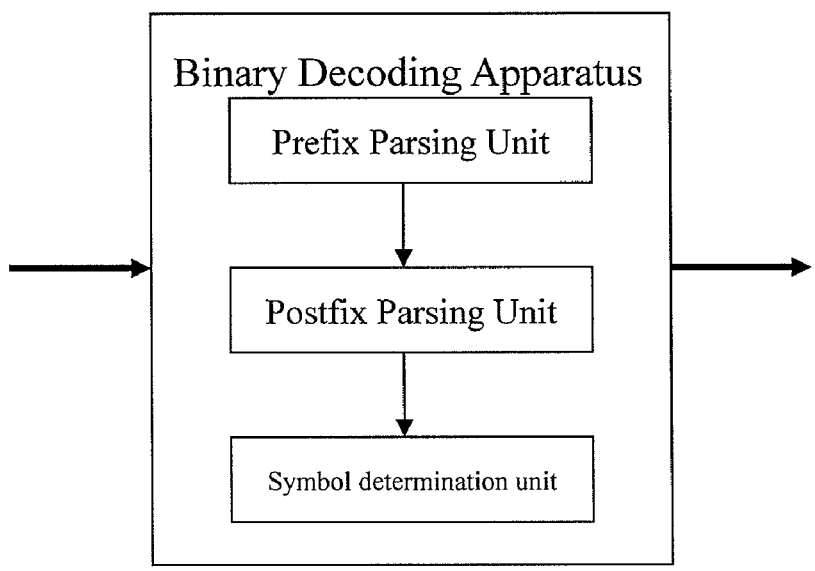
FIG. 6 is a block diagram illustrating an embodiment of a decoding apparatus as provided in the present invention.

The invention also provides a binary decoding apparatus. The specific implementation has a configuration as shown in FIG. 6.

Prefix Parsing Unit

For a binary codeword of an MVD absolute value which is obtained through arithmetic decoding, coded codewords for subsets are obtained according to a pre-configured subset coding rule. The coded codewords for the subsets are matched in turn with a bit segment in the most front of the binary codeword. If a codeword is matched, the bit segment in the corresponding binary codeword is taken as the prefix and the remaining bit segment as the postfix. From the determined prefix and the subset coding method, it is possible to determine the number of the corresponding subset.

As described in connection with the previous examples, the subset coding rule may be configured to divide symbols for MVD absolute values into 3 subsets: subset 1 including 0, subset 2 including nonnegative integers greater than or equal to 1 and less than N, and subset 3 including all other nonnegative greater than or equal to N, where N is greater than 4 and less than 16. The prefix parsing unit may match with the numbers (that is, coded codewords) of the three subsets, so as to perform prefix parsing.

(2) Postfix Parsing Unit

According to the subset class, the coding rule for the subset of symbols may be determined. According to the coding rule, the postfix is parsed, so as to obtain a symbol in the subset.

Referring to the examples previously described, the coding rule for the symbols included in the subset may be configured as follows: symbol 0 in the subset 1 is coded as 0, and the binary result is also 0; truncated unary coding is used to perform binary coding on the symbols in the subset 2; and order 3 exp-Golomb coding is used to perform binary coding on the symbols in the subset 3. According to this coding rule, a corresponding symbol may be obtained via decoding.

(3) Symbol Determination Unit

Based on the above parsing result and the subset division rule, the symbol for the MVD absolute value may be obtained.

Specific applications of the apparatus may be found in the examples described with reference to the above binary decoding implementations, and the description is omitted here.

From the coding process shown in FIG. 2, it can be seen that the method of the invention not only makes full use of the source properties, but also effectively prevents the codeword length from being too long. It has been experimentally testified that a better compression effect may be achieved during arithmetic coding process.

As noted above, the invention has been described in terms of exemplary embodiments, but the scope of the invention is not limited to this context. From the teachings of this disclosure, any person skilled in the art will appreciate that other modifications and alternatives are possible, which shall fall within the scope of the invention. Accordingly, the scope of the invention is to be defined by the appended claims.

What is claimed is:

1. A binary coding method for MVD (Motion Vector Difference) absolute values in a video encoder, comprising:
   dividing symbols for MVD absolute values into a plurality of subsets, each subset comprising symbols for one or more consecutive nonnegative integers;
   assigning a binary codeword for each subset;
   assigning a binary codeword for each of the symbols in each subset, wherein the same coding method is used for all the symbols in a subset; and
   concatenating and outputting the binary codeword for each subset and the binary codeword for each symbol in the subset, as a binary coding result for the symbol.

2. The method according to claim 1, wherein at least one of the subsets has at least two symbols, and when a subset has only one symbol, the symbol is assigned no binary codeword.

3. The method according to claim 1, wherein fixed length coding or variable length coding is used to assign a binary codeword for each subset, and the variable length coding comprises truncated unary coding.

4. The method according to claim 1, wherein the coding type for the symbols in a subset comprises: applying variable length coding to a subset having two or more symbols, including truncated unary coding, Huffman coding and exp-Golomb coding.

5. The method according to claim 1, wherein the symbols for MVD absolute values are divided into 3 subsets: subset 1 comprising 0, subset 2 comprising nonnegative integers greater than or equal to 1 and less than N, and subset 3 comprising all other nonnegative integers greater than or equal to N, where N is greater than 4 and less than 16.

6. The method according to claim 5, wherein for the symbol in the subset 1, symbol 0 is coded as 0, and the binary result is also 0.

7. The method according to claim 5, wherein for the symbols in the subset 2, truncated unary coding is used to perform binary coding.

8. The method according to claim 5, wherein for the symbols in the subset 3, order 3 exp-Golomb coding is used to perform binary coding.

9. The method according to claim 1, wherein dividing the symbols for MVD absolute values into the plurality of subsets further comprises: dividing the symbols for MVD absolute values into the plurality of subsets according to probability distribution properties.

10. A binary coding apparatus for MVD (Motion Vector Difference) absolute values in a video coder, comprising a subset division unit, a subset binary coding unit, a subset symbol binary coding unit and a binary result determination unit, wherein:
    the subset division unit is configured to divide symbols for MVD absolute values into a plurality of subsets, each subset including symbols for one or more consecutive nonnegative integers;
    the subset binary coding unit is configured to assign a binary codeword for each subset;
    the subset symbol binary coding unit is configured to assign a binary word for each of the symbols in each subset, wherein the same coding method is used for all the symbols in a subset; and
    the binary result determination unit is configured to concatenate and output the binary codeword for each subset and the binary codeword for each symbol in the subset, as a binary coding result for the symbol.

11. The apparatus according to claim 10, wherein the subset division unit is further configured to divide the symbols for MVD absolute values into 3 subsets: subset 1 comprising 0, subset 2 comprising nonnegative integers greater than or equal to 1 and less than N, and subset 3 comprising all other nonnegative integers greater than or equal to N, where N is greater than 4 and less than 16.

12. The apparatus according to claim 11, wherein symbol 0 in the subset 1 is coded as 0 and the binary result is also 0 in the subset binary coding unit.

13. The apparatus according to claim 11, wherein the subset symbol binary coding unit uses truncated unary coding to perform binary coding on the symbols in the subset 2, and uses order 3 exp-Golomb coding to perform binary coding on the symbols in the subset 3.

14. The apparatus according to claim 10, wherein the subset division unit is further configured to divide the symbols for MVD absolute values into the plurality of subsets according to probability distribution properties.

15. A binary decoding method for MVD (Motion Vector Difference) absolute values in a video decoder, comprising:
receiving a binary codeword for an MVD absolute value;
matching coded codewords for subsets corresponding to a subset coding rule sequentially with a bit segment in the most front of the binary codeword, to determine the number of a subset to which the MVD absolute value belongs;
obtaining a coding rule for symbols included in the subset according to the determined subset number;
parsing other bit segments in the binary codeword according to the obtained coding rule, to obtain a symbol in the subset; and
determining a symbol for the MVD absolute value according to a subset division rule.

16. The method according to claim 15, wherein with the subset coding rule, symbols for MVD absolute values are divided into 3 subsets: subset 1 comprising 0, subset 2 comprising nonnegative integers greater than or equal to 1 and less than N, and subset 3 comprising all other nonnegative integers greater than or equal to N, where N is greater than 4 and less than 16.

17. The method according to claim 16, wherein according to the coding rule for the symbols included in the subset: symbol 0 in the subset 1 is coded as 0, and the binary result is also 0; truncated unary coding is used to perform binary coding on the symbols in the subset 2; and order 3 exp-Golomb coding is used to perform binary coding on the symbols in the subset 3.

18. A binary decoding apparatus for MVD (Motion Vector Difference) absolute values in a video decoder, comprising a prefix parsing unit, a postfix parsing unit and a symbol determination unit, wherein:
the prefix parsing unit is configured to match coded codewords for subsets corresponding to a subset coding rule sequentially with a bit segment in the most front of an acquired binary codeword for an MVD absolute value, so as to determine the number of a subset to which the MVD absolute value belongs;
the postfix parsing unit is configured to obtain a coding rule for symbols included in the subset according to the subset number determined by the prefix parsing unit, and parse other bit segments in the binary codeword according to the obtained coding rule, so as to obtain a symbol in the subset; and
the symbol determination unit is configured to determine a symbol for the MVD absolute value according to a subset division rule.

19. The apparatus according to claim 18, wherein with the subset coding rule, symbols for MVD absolute values are divided into 3 subsets: subset 1 comprising 0, subset 2 comprising nonnegative integers greater than or equal to 1 and less than N, and subset 3 comprising all other nonnegative integers greater than or equal to N, where N is greater than 4 and less than 16.

20. The apparatus according to claim 19, wherein according to the coding rule for the symbols comprised in the subset: symbol 0 in the subset 1 is coded as 0, and the binary result is also 0; truncated unary coding is used to perform binary coding on the symbols in the subset 2; and order 3 exp-Golomb coding is used to perform binary coding on the symbols in the subset 3.

* * * * *